Jan. 17, 1950 — O. H. BANKER — 2,495,050
CHUCK
Filed June 26, 1946 — 2 Sheets-Sheet 1
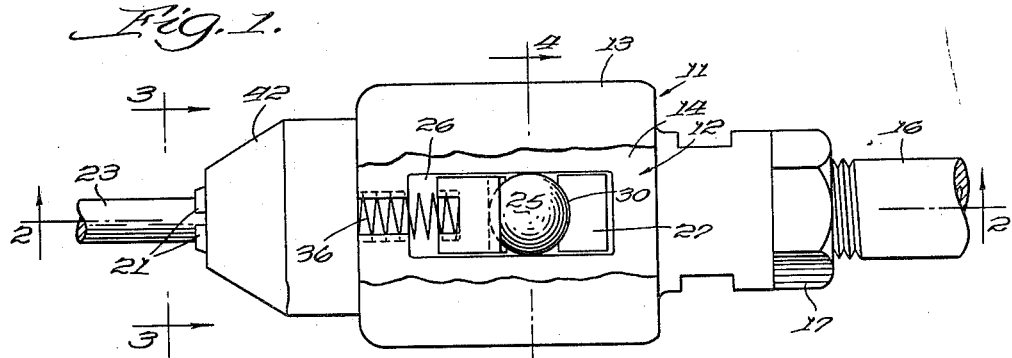
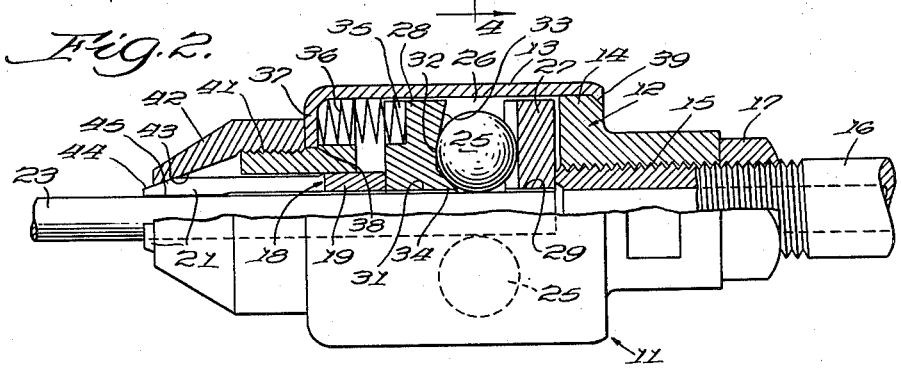
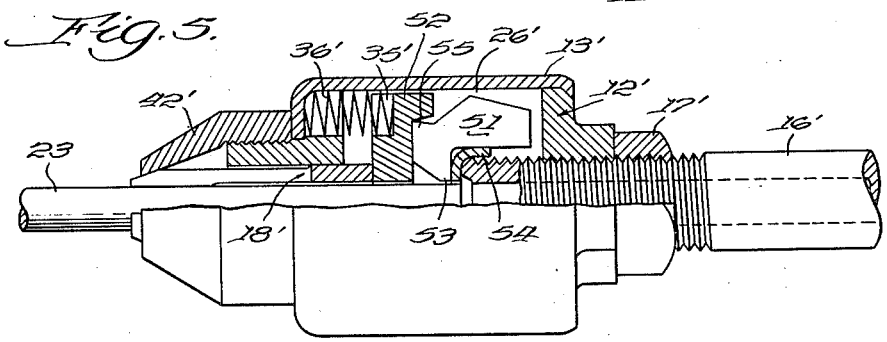
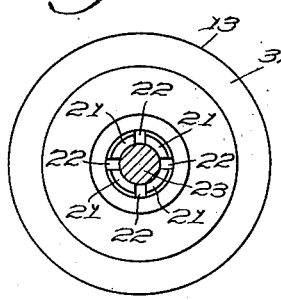
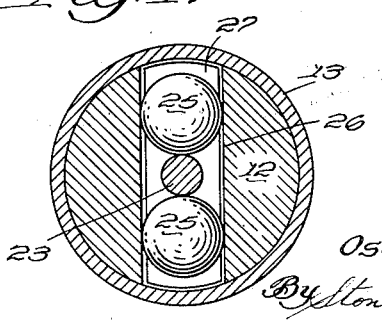
Inventor:
Oscar H. Banker.
By Stone, Artman + Bisson
Attys.

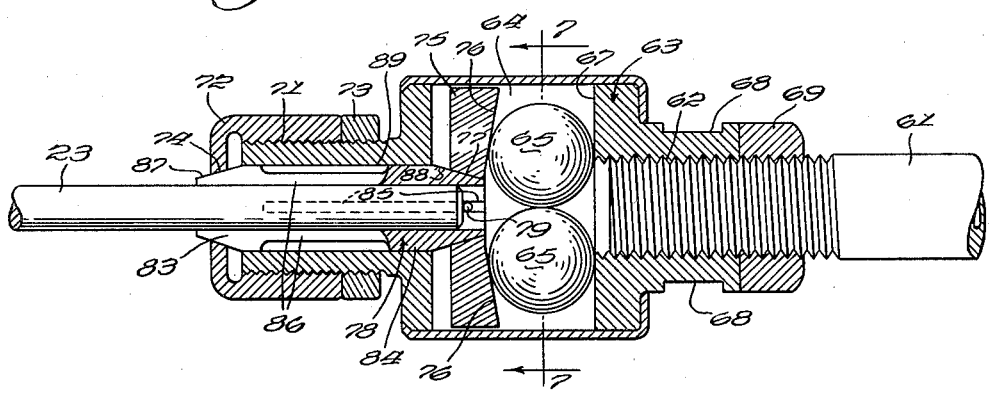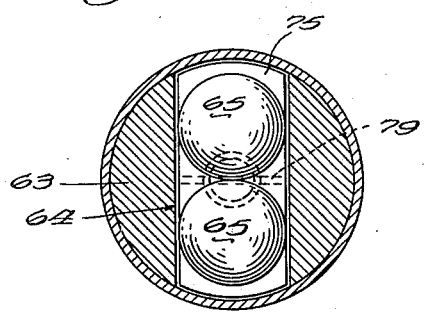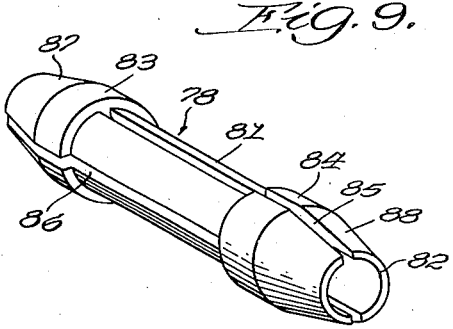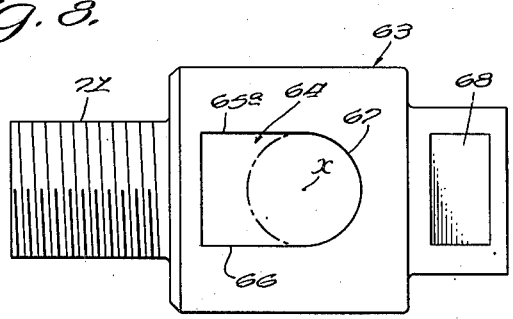

Patented Jan. 17, 1950

2,495,050

UNITED STATES PATENT OFFICE 2,495,050

CHUCK

Oscar H. Banker, Evanston, Ill.

Application June 26, 1946, Serial No. 679,484

4 Claims. (Cl. 279—51)

This invention concerns tool holding devices such as small drills, cutters and grinding wheels employed by artisans such as pattern makers or tool and die makers, and more particularly concerns a type of device having a rotatable tool holding means together with means responsive to the rate of rotation of such tool holding means for enabling the latter to securely grip and retain the shank of a tool.

A general object of the invention is the provision of a tool holding and operating device into which a tool may be easily inserted or removed but which is automatically operable, when the device is driven, to securely grip and retain the tool in proper assembly.

Another object of the invention is the provision of a tool holding and operating device for employing centrifugal weights for providing a holding force for a tool inserted into the device, together with an improved assemblage cooperable with the weights in a manner deriving a high character of mechanical advantage from the inertia force of the weights in the gripping of a tool shank.

Still another object of the invention is the provision of a chuck operating means which is advanceable under the force of the inertia weights for causing the chuck to grip firmly onto a tool shank but which operating means is retractable from the chuck pursuant to cessation in operation of the tool whereby the chuck will remain gripped onto the tool until such time as the operator lightly taps or presses retractively upon the chuck. This enables an operator to momentarily put the tool aside without incurring the likelihood of the tool dropping from the device or becoming improperly assembled therewith.

The invention further contemplates and has for one of its objects a novel form of inertia weight carrier adapted to be placed in a casing of small dimensions and capable of expedient manufacture.

Still a further object is the provision of a tool holding device wherein there is means adjustable to compensate for wear upon the parts actuated by the inertia weights and whereby the weights can be caused to retain their initial effectiveness in the operation of the device for gripping onto tool shanks.

The above objects and other desirable objects, capabilities and advantages of the invention will be more clearly understood from the ensuing description when read in conjunction with the annexed drawings, wherein:

Fig. 1 is a plan view of a tool holding device embodying a preferred form of the invention.

Fig. 2 is a side elevational view of the device illustrated in Fig. 1, and having the upper portion thereof shown in section along a plane containing the principal axis of the device.

Fig. 3 is an end elevational view taken on the line 3—3 of Fig. 1.

Fig. 4 is a transverse sectional view taken upon the line 4—4 of Fig. 1 to illustrate the disposition of the inertia weights within the carrier therefor.

Fig. 5 is a view taken similarly to Fig. 2 of a modified form of the invention employing a pivotal type of inertia weight in contrast to the spherical weight.

Fig. 6 is a longitudinal sectional view taken centrally through a third embodiment of the invention.

Fig. 7 is a transverse sectional view taken on the line 7—7 of Fig. 6.

Fig. 8 is a plan view of the inertia weight carrier of the third embodiment.

Fig. 9 is a perspective view of a modified form of chuck employed in the third embodiment.

Referring now to Figs. 1–4 of the drawings, a casing 11 of the tool holding and operating device therein illustrated is formed of a centrifugal weight carrier 12 and a cylindrical member 13 mounted on and about an enlarged central cylindrical body portion 14 of the carrier 12. The casing 11 is screwed onto a threaded end section 15 of a hollow drive shaft 16 which may be the armature shaft of a small electric motor of a size capable of being conveniently held in the hand of an operator. The drawings illustrate the device to an enlarged scale of about 2.5 to 1. A lock-nut 17 is employed for retaining the casing 11 rigidly assembled with the drive shaft 16. Consequently it will be seen that the casing of the device and those parts within the casing rotate with the drive shaft.

A chuck 18 is supported in the casing coaxially with the drive shaft 16, this chuck comprising an annular base portion 19 and four gripping fingers 21 extending endwise therefrom and equally spaced circumferentially of said annular end portion. These fingers 21 of the chuck are separated by axial slots 22 as illustrated in Fig. 3. Chuck fingers 21 are for receiving and gripping onto a tool shank 23 which extends endwise into the device through the annular portion 19 of the chuck. Normally the chuck fingers 21 will be expanded and thereby provide a slight clearance with respect to the tool shank 23 but said fingers are adapted to be contracted into gripping relation with the shank for retaining the same in assembly with the device by the centrifugal action of spherical inertia weights 25. These weights 25 are contained within a rectangular bore 26 extending diametrically across and through the weight carrier 12. This bore or passage 26 is perhaps best illustrated in Figs. 1 and 4, a section of the jacket or casing member 13 being cut away in Fig. 1 to expose an end of said bore 26.

In addition to the inertia weights 25 within the diametric rectangularly sectioned bore 26 there is a force reaction bar-like member 27 and a bar-like cam member 28. These members 27 and 28 are spaced axially of the carrier 12 and receive the inertia weights therebetween. Member 27 has a hole 29 for receiving a section of the tool 23 and a corresponding hole 31, is had by the member 28. The face of the member 27 disposed toward the weights 25 has a cylindrical profile 30 extending radially of the device and struck at a radius slightly larger than that of the spherical weights; see Fig. 1.

Cam member 28 has notches 32 for the reception of the inertia weights, only one of said notches being shown in the drawings, Fig. 2. A cam profile surface 33 forms the outer side of each notch 32 while a ball retaining boss 34 is disposed at the other or radially inner side of each notch 32.

A pair of spring retaining seats 35 are formed adjacently to respective ends of the bar-like cam member 28 for the reception of ends of respectively associate springs 36, one of such seats and springs being shown in the drawings. Subsequent to the placing of the members 27 and 28 and the weights 25 in the carrier slot 26 and the disposal of the springs 36 in their seats 35, the casing jacket 13 is assembled onto the carrier by sliding such jacket endwise over the left end of said carrier. This operation brings a flange 37 against an annular shoulder 38 of the carrier whereupon the rim of the jacket is peened over as indicated at 39 for holding the parts in assembly. Casing flange 37 serves as a reaction means for one end of each of the two springs 36.

The left end of the inertia weight carrier 12 has an exteriorly threaded portion 41 onto which is screwed a cam member 42 having a conical interior cam surface 43 for cooperation with mating cam surfaces 44 on the outer ends of the chuck fingers 21.

In Fig. 2 the device is shown with its parts at rest; that is, with the parts as they may normally be when the drive shaft 16 is not rotating. Under these conditions the springs 36 have pressed the cam member 28 and the weights 25 to the right and the chuck 18 has also been pressed to the right (manually) to leave a slight clearance at 45 between the outer end portions of these fingers and the shank 23 of the inserted tool. Prior to the insertion of the tool shank 23 the bosses 34 on the cam member 28 prevented either of the weights 25 from dropping radially inwardly of the device with any portion thereof in axial registry with the space within the holes 29 and 31 to be occupied by the tool shank.

The device is adjusted for cooperating with tool shanks 23 or the like of a certain diameter while the lock-nut 17 is loosened. With the lock-nut loosened and with the chuck fingers 21 relaxed or expanded, the tool shank is inserted into the device into the position illustrated in Fig. 2. At this time because of the expanded condition of the chuck fingers 21, there will be a certain amount of looseness of the tool shank within the device. Thereafter the casing 11 and the drive shaft 16 are relatively rotated for advancing said shaft into the device and thereby advancing the weight reaction bar 27, the weights, the cam bar 28 and the chuck 18 until sufficient cam action has occurred between the cam profile 43 and the cam surfaces 44 on the chuck fingers for causing the chuck fingers to very lightly engage the tool shank. The amount of this engagement is such that the tool shank may be withdrawn or inserted with a small frictional resistance by the chuck jaws, the frictional resistance being sufficient to prevent accidental dropping of the tool from the device while it is at rest. The lock-nut 17 is then turned tightly against the adjacent end of the weight-carrier 12 for maintaining this adjustment. While the device is so adjusted, any one of the tools of a set whose shanks are the same diameter can be inserted into the chuck and lightly engaged by the chuck fingers to prevent accidental dropping of the tool from the device. After a tool shank has been inserted into the device, adjusted as aforesaid, and upon rotation of the drive shaft 16 pursuant to placing the tool in use, the weights 25 will be caused to revolve about the axis of the device as it rotates with the drive shaft and thereby react between the cylindrical surface 30 of the reaction member 27 and their respective cam profiles 33 on the cam member 28. This causes the cam member 28 to be moved to the left incident to compressing the springs 36 and to advancing the chuck 18 bodily to the left. As a consequence the inclined cam surfaces 44 at the ends of the chuck fingers 21 are deflected radially inwardly by the conical cam surface 43 into tight gripping relation with the tool shank. In this manner the tool is held firmly within the rotated device and caused to rotate therewith. Later when the device may be temporarily put aside, while it is at rest or not rotating, the tool does not become loosened in the device. On the contrary when the weights 25 and the cam bar 28 are moved to the right by springs 36 upon the termination of the centrifugal force of these weights, the member 28 simply retracts from its engagement with the annular end portion 19 of the chuck, leaving the outer ends of the chuck fingers wedged between the conical surface 43 and the tool shank. Should it be desired to replace the tool with another, it is only necessary to lightly tap the outer end of the tool or the outer ends of the shank fingers to move them into the device and thereby release their grip upon the tool shank. This can be done by the operator while using only one hand for this purpose, leaving his other hand free for simultaneously engaging another tool or the like preparatory to inserting it into the device for being automatically gripped onto and retained in the device when the latter is rotated pursuant to being placed in operation.

It should be noted that the springs 36 are made only of sufficient strength to urge the cam member 28 against the inertia weights to prevent rattling of the parts when the device is not in use. Stronger springs are not desired because the force exerted thereby counteracts the inertia force of the weights for gripping the chuck fingers onto a tool.

Another important feature of the device is the threaded mounting of the coaxial cam member 42 onto the left end of the casing whereby this cam member is removable and replaceable by a similar cam member having a slightly different radius for its cam surface 43 to adapt the device for utilizing a different size chuck 18 whereby a set of tools having a different shank diameter may be accommodated by the device.

Another important feature of the device is that arrangement wherein the left end of the drive shaft 16 abuts against and serves as a reaction means for the weight reaction bar 27. This arrangement makes it possible to adjust the force reaction bar 27 axially in the casing to compensate for wear of the movable parts or for different distances which it may be desired to axially advance chucks 18 which may be adapted for use with different size tool shanks. In adjusting the force reaction bar 27 within the case, the lock-nut 17 will be loosened and the casing rotated in the desired direction upon the threaded section 15 of the drive shaft the required amount and then the lock-nut retightened.

By providing the bores or holes 29 and 31 in the barlike members 27 and 28 the device is adapted to be utilized in connection with a hollow arbor such as 16 in connection with a work piece which might be gripped by the chuck instead of the shank of a tool. When so used, an elongated piece of work could be advanced into the hollow arbor as far as desired and held in any degree of advancement by the gripping of the chuck thereonto.

The modification shown in Fig. 5 distinguishes primarily from the embodiment in the lower numbered figures in the respect of employing pivotal type centrifugal weights 51. To expedite this description those parts of the Fig. 5 embodiment that respectively correspond to parts in the first embodiment are designated by the same respective reference characters with the addition of a prime. The diametric slot 26' contains a bar-like member 52 containing spring seats 35' near its ends. This member 52 is urged to the right by springs 36' in the same manner that the cam member is urged. Toe portions 53 of the weights 51 bear against a sheet metal ring 54 seated over and about the inner end of the drive shaft 16' when the bodies of such weights are thrown centrifugally outwardly. The weights pivot at their point of contact with the ring 54 and thereby cause heel portions 55 to move to the left and slide radially inwardly along the associated face of the bar 52 incident to moving this bar to the left in the same manner that the inertia weight 25 of the first embodiment moves the cam bar 28 to the left, and for the same purpose and with the same effect. The springs 36' also serve to restore the bar 52 and the weights 51 to the position illustrated in Fig. 5 when the device ceases rotation. Upon such retraction of the bar 52 it is adapted to separate from the right end of the chuck 18' in the same manner as explained above with respect to the cam bar 28 and the chuck 18.

In the fourth embodiment shown in Figs. 6 to 8, inclusive, the device is assembled with a drive shaft or arbor 61 by means of a threaded section 62 upon said shaft and mating threads within a threaded bore of a centrifugal weight carrier 63. A diametric slot 64 in the carrier 63 receives a pair of spherical inertia weights 65. As seen in Fig. 8 the slot 64 can be formed by first drilling a circular hole about a center X and thereafter machining away material from the carrier to form parallel sides 65a and 66 which extend tangentially from a curved end 67 constituting one-half of the initial bore taken through the carrier.

Wrench accommodating facets 68 are formed upon an extension at the rear end of the weight carrier to facilitate the turning of the carrier onto the threaded end of the drive shaft 61, and the desired position of the carrier upon the shaft is maintainable by a lock-nut 69.

The opposite or left end of the weight carrier has a threaded exterior 71 to receive an annular cam member 72 which is held in position by a lock-nut 73. This cam member 72 has a conical cam face 74 disposed coaxially of the device.

A cam bar 75 disposed within the carrier slot 64 has inclined cam faces 76 converging radially outwardly with respect to the opposed cylindrical end face 67 of said slot. A conical bore 77 in the member 75 is disposed coaxially of the device. This conical cam surface 77 as well as the cam surface 74 is adapted for closing gripping fingers of a double ended chuck 78 which is shown in perspective in Fig. 9. Positive rotation of the chuck with the cam bar 75 and with the carrier 63 is insured by a pin 79 which extends diametrically across the conical bore 77 and has its two ends anchored within the member 75.

The double ended chuck member is shown in perspective in Fig. 9. This member comprises an elongated body portion 81 transversed by a central axial bore 82 and having enlargements or heads 83 and 84 at its two ends. Each enlargement is axially split by a pair of diametrically opposite slots extending lengthwise of the device virtually to the head at the opposite end. Those slots associated with the head 84 and extending toward the head 83 are designated 85 while those slots splitting the head 83 and extending toward the head 84 are designated 86. The slots 85 and 86 communicate radially through the body of the chuck from the bore 82 to the exterior periphery throughout their length. Tapered end faces or cams 87 and 88 are formed on the two heads 83 and 84. The taper of faces 88 is greater than that of the faces 87 so they will release more readily from their cooperative cam surface 77 when a tool is tapped loose preparatory to removal, and thereby assure that a tool will not remain locked in the head 84 by the cam surface following release of the head 83 by the surface 74. End portions of the slots 85 of the chuck receive the pin 79 for positively constraining the chuck to rotate with the cam bar 75 and the remainder of the device. This pin 79 also serves as a stop to limit the distance a tool shank 23 can be inserted inwardly through the chuck bore.

While the device is at rest as illustrated in Fig. 6, the two split heads 83 and 84 will be in their expanded condition to facilitate insertion of a tool shank. Subsequent to the insertion of the tool shank, rotation of the device with the drive shank or spindle 61 will cause the centrifugal weights 65 to move radially outwardly of the device and to thereby react between the surfaces 67 and 76 for advancing the cam bar 75 to the left. As a consequence of the cam bar advancing, its conical bore contracts upon the conical face 88 of the chuck to cause this end of the chuck to grip the tool shank. The heads of the chuck are slidably contained within a bore 89 of the centrifugal weight carrier so that endwise pressure of the cam bar 75 onto the conical end of the chuck head 84 will cause advancement of the chuck endwise within said bore 89 and thereby cause the tapered end of the head 83 to be contracted by the conical surface 74 on the member 72 whereby the head 83 is also clamped onto the tool shank.

By this expedient of employing the two split heads for concurrently gripping the tool shank at axially spaced positions, the chuck is adapted to efficiently constrain the tool shank from endwise movement in either axial direction while held by the chuck. Thus it is possible for an artisan to exert endwise force in either direction through the tool shank to a rotating head or the like thereon without causing the tool shank to creep or modify its position within the chuck.

As in the first embodiment, when the device ceases rotation preparatory to its being momentarily laid aside the weights 65 may drop to a centered position radially of the device but the end 83 of the chuck will remain wedged within the conical surface 74 and retain a gripping relation with the tool shank.

Adjustment for wear in the device may also be made by loosening the lock-nut 73 and thereafter changing the position of the member 72 and its cam surface 74 axially of the device and then re-tightening the lock-nut.

Having thus described a limited number of embodiments of the invention with the view of clearly and concisely illustrating the same, I claim:

1. In a rotatable centrifugally energized gripping device, a centrifugal weight carrier having a body and a stem projecting endwise therefrom, said body having a diametric slot and said stem containing an axial bore intersecting said slot, an elongated chuck having an axial bore therethrough, said chuck comprising fingers extending lengthwise thereof and having their free end terminals extending into said slot, cam means on the radial outer periphery of said finger terminals, a follower structure in said slot and having cam surfaces slidable onto said cam surfaces for contracting said fingers into a gripping relation when said follower structure is advanced axially of the carrier within said slot, said follower structure comprising a pin extending diametrically across the chuck bore and between finger terminals thereof to provide means for positively rotating the chuck and for limiting the distance an article to be held by the device can project inwardly of the device through the chuck bore, and centrifugal weights in said slot and adapted to impart an advance force to said follower structure responsively to rotation of the device.

2. In a rotatable centrifugally energized gripping device, a centrifugal weight carrier having a body and a stem projecting endwise therefrom, said body having a diametric slot and said stem containing an axial bore intersecting said slot, an elongated chuck traversed by an axial bore and reciprocatable endwise in said stem bore between gripping and releasing positions, said chuck comprising sets of contractible fingers projecting oppositely endwise thereof, the fingers in one set having terminals at one end of the chuck and the fingers of the other set having terminals at the opposite end thereof, cam means on the terminals of said fingers, complemental cam means on said stem for coacting with the cam means on the finger terminals projecting outwardly of the stem bore for contracting the fingers bearing such terminals when the chuck is moved outwardly of the stem bore onto the gripping position, a follower structure in said slot and including means slidable onto the finger terminal cam means of the inwardly projecting fingers for contracting these fingers into a gripping position when said carrier structure is advanced axially of the carrier toward said stem, said follower structure also including a pin extending diametrically across the chuck bore and between finger terminals at the inner end of said chuck to provide means for positively rotating the chuck and for limiting the distance an article to be held by the device can project inwardly of the device through the chuck bore, and centrifugal weights in said slot, said weights being adapted to impart an advancing force to said follower structure and to said chuck responsively to rotation of the device.

3. In a rotatable centrifugally energized gripping device, a centrifugal weight carrier having a coaxial chuck-receiving bore extending inwardly from an end thereof and a diametric slot intersected by said bore, one end of said slot, axially of the carrier, having a semi-cylindrical surface and said slot having opposed side wall portions extending in parallelism axially of the carrier tangentially of the cylindrical wall surface at respective terminals thereof, an elongated follower structure in said slot transversely of the bore and retractively advanceable therein axially of the carrier away from the cylindrical end of the slot, and spherical centrifugal weights in the semi-cylindrical end of said slot for imparting an advancing force to said follower structure responsively to rotation of the device while reacting against said semi-cylindrical surface.

4. In a rotatable centrifugally energized gripping device, a centrifugal weight carrier having a coaxial chuck-receiving bore extending inwardly from an end thereof and a diametric slot intersected by said bore, one end of said slot, axially of the carrier, having a semi-cylindrical surface, and said slot having opposed side wall portions extending in parallelism axially of the carrier tangentially of the cylindrical wall surface at respective terminals thereof.

OSCAR H. BANKER.

REFERENCES CITED

The following references are of record in the file of this patent:

UNITED STATES PATENTS

| Number | Name | Date |
|---|---|---|
| 442,230 | Libby | Dec. 9, 1890 |
| 1,990,525 | Chancellor | Feb. 12, 1935 |
| 2,370,924 | Sigenthaler | Mar. 6, 1945 |
| 2,373,321 | Lawe | Apr. 10, 1945 |